United States Patent
Westerinen et al.

(10) Patent No.: US 9,135,599 B2
(45) Date of Patent: Sep. 15, 2015

(54) SMART NOTEBOOK

(75) Inventors: William J. Westerinen, Issaquah, WA (US); J. Edward Allard, Seattle, WA (US); Julio Estrada, Medina, WA (US); Michael Alan Dougherty, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 803 days.

(21) Appl. No.: 12/487,620

(22) Filed: Jun. 18, 2009

(65) Prior Publication Data

US 2010/0325559 A1 Dec. 23, 2010

(51) Int. Cl.
*G06Q 10/10* (2012.01)
*G06F 3/048* (2013.01)
*G06F 3/0484* (2013.01)
*G06F 3/0481* (2013.01)

(52) U.S. Cl.
CPC ............ *G06Q 10/10* (2013.01); *G06F 3/04815* (2013.01); *G06F 3/04847* (2013.01)

(58) Field of Classification Search
CPC ............ G06Q 10/109; G06Q 10/1095; G06Q 10/103; G06Q 10/1093; H04L 12/1822; H04L 12/1818
USPC ................................. 715/734, 753, 759, 864
See application file for complete search history.

(56) References Cited

U.S. PATENT DOCUMENTS

| | | | |
|---|---|---|---|
| 5,107,443 A | 4/1992 | Smith et al. | |
| 5,717,879 A * | 2/1998 | Moran et al. | 715/716 |
| 6,342,906 B1 | 1/2002 | Kumar et al. | |
| 6,363,352 B1 * | 3/2002 | Dailey et al. | 705/7.19 |
| 6,564,246 B1 | 5/2003 | Varma et al. | |
| 6,654,032 B1 * | 11/2003 | Zhu et al. | 715/753 |
| 6,832,242 B2 * | 12/2004 | Keskar | 709/204 |
| 7,120,672 B1 | 10/2006 | Szeto et al. | |
| 7,133,054 B2 | 11/2006 | Aguera y Arcas | |
| 7,133,900 B1 | 11/2006 | Szeto | |
| 7,162,699 B1 * | 1/2007 | Pena-Mora et al. | 715/751 |
| 7,188,143 B2 | 3/2007 | Szeto | |
| 7,200,590 B2 | 4/2007 | Everett-Church et al. | |
| 7,213,206 B2 * | 5/2007 | Fogg | 715/706 |

(Continued)

FOREIGN PATENT DOCUMENTS

WO 2008083490 A1 7/2008

OTHER PUBLICATIONS

Boticki et al. A System Architecture for a Context-aware Blended Mobile Learning Environment; Journal of Computing and Information Technology 17:2 (2009) 165-175.*

(Continued)

*Primary Examiner* — Amy M Levy
(74) *Attorney, Agent, or Firm* — Micah Goldsmith; Judy Yee; Micky Minhas

(57) ABSTRACT

Techniques are disclosed herein for allowing sharing of notes and ideas between electronic devices. The presence of a number of electronic devices is determined. A determination is made that the electronic devices are to be part of a shared workspace. A shared workspace is generated for the electronic devices. The shared workspace is displayed on a display screen of at least one of the electronic devices. The shared workspace that is displayed may be based on the capabilities of the electronic device. The shared workspace that is displayed may reflect the location of the electronic devices.

4 Claims, 12 Drawing Sheets

(56) References Cited

U.S. PATENT DOCUMENTS

| | | | |
|---|---|---|---|
| 7,242,389 B1* | 7/2007 | Stern | 345/158 |
| 7,257,426 B1 | 8/2007 | Witkowski et al. | |
| 7,269,632 B2* | 9/2007 | Edeker et al. | 709/217 |
| 7,353,252 B1* | 4/2008 | Yang et al. | 709/204 |
| 7,430,721 B2 | 9/2008 | Johanson et al. | |
| 7,995,090 B2* | 8/2011 | Liu et al. | 348/14.01 |
| 2002/0140666 A1* | 10/2002 | Bradski | 345/156 |
| 2003/0222917 A1* | 12/2003 | Trantow | 345/778 |
| 2004/0189701 A1 | 9/2004 | Badt | |
| 2005/0093868 A1* | 5/2005 | Hinckley | 345/502 |
| 2005/0096870 A1* | 5/2005 | Butler | 702/183 |
| 2005/0120096 A1 | 6/2005 | Rekimoto et al. | |
| 2006/0053379 A1* | 3/2006 | Henderson et al. | 715/751 |
| 2006/0146765 A1* | 7/2006 | Van De Sluis et al. | 370/338 |
| 2006/0242584 A1 | 10/2006 | Johanson et al. | |
| 2006/0267982 A1 | 11/2006 | Aguera y Arcas | |
| 2007/0061399 A1* | 3/2007 | Schmieder et al. | 709/204 |
| 2007/0104378 A1 | 5/2007 | Aguera Y Arcas | |
| 2007/0113181 A1* | 5/2007 | Blattner et al. | 715/706 |
| 2007/0124503 A1* | 5/2007 | Ramos et al. | 709/248 |
| 2007/0190494 A1* | 8/2007 | Rosenberg | 434/11 |
| 2007/0192329 A1* | 8/2007 | Croft et al. | 707/10 |
| 2008/0050024 A1 | 2/2008 | Aguera Y Arcas | |
| 2008/0114844 A1* | 5/2008 | Sanchez et al. | 709/206 |
| 2008/0215995 A1* | 9/2008 | Wolf | 715/758 |
| 2009/0021486 A1 | 1/2009 | Chaudhri et al. | |
| 2009/0109180 A1* | 4/2009 | Do et al. | 345/173 |
| 2009/0222742 A1* | 9/2009 | Pelton et al. | 715/753 |
| 2009/0249223 A1* | 10/2009 | Barsook et al. | 715/753 |
| 2009/0254840 A1* | 10/2009 | Churchill et al. | 715/753 |
| 2010/0228825 A1* | 9/2010 | Hegde et al. | 709/204 |
| 2012/0064921 A1* | 3/2012 | Hernoud et al. | 455/456.6 |

OTHER PUBLICATIONS

Boticki et al. Introducing Location-awareness into a Learning Environment Supported by Mobile Devices. Presented in the Proceedings of the 1st International Conference on Virtual Learning, (2006) Bucharest, Romania.*

Boticki et al. Using mobile devices to entice the social component of learning. Presented at the 3rd International Conference on Mobile and Computer Aided Learning, IMCL2008 (2008) Amman, Jordan.*

Karen Ammann, The Interactive Whiteboard, teachers.redclay.k12.de.us/Judith.Conway/Basic%20Smartboard%20Directions.doc.

Lyndon Cheney, "Wireless Access to Whiteboards", BECTA, Leading Next Generation Learning, Jul. 25, 2007, http://lists.becta.org.uk/pipermail/vi-forum/2007-July/009941.html.

Thomas W. Doeppner, "An Electronic Student Notebook", Apr. 26, 2003, 8 pages, http://cs.brown.edu/~twd/description.htm.

Abdurazzag Ali Aburas, "PDA Mobile Learning Using Indoor Intelligent Wireless Whiteboard", Turkish Online Journal of Distance Education, Apr. 2007, pp. 9-13, vol. 8, No. 2, http://tojde.anadolu.edu.tr/tojde26/pdf/auras_khalifa.pdf.

Linda L Briggs, "Universities Use Collaborative Software to Share Classroom Displays", Apr. 1, 2009, http://209.85.229.132/search?q=cache:OUUVs_quKZIJ:www.campustechnology.com/Articles/2009/04/01/Universities-Use-Collaborative-Software-To-Share-Classroom-Displays.aspx+share+data+whiteboard+classroom+(notebook+OR+laptop+or+PDA)&cd=5&hl=en&ct=clnk&gl=in&client=firefox-a.

allNETDevices Staff, "Wireless Transfer of Whiteboard Notes for Handhelds", Realtime IT News, Feb. 26, 2001, http://www.internetnews.com/bus-news/article.php/598601/Wireless+Transfer+of+Whiteboard+Notes+for+Handheld.htm.

"Intelligent & Interactive Whiteboard", Solution of Life, 5 pages, http://www.solnetcom.com/download/Datasheet%20-%20I&1%20Whiteboard%20(Standard%20Type)-090115.pdf.

Microsoft Office Online, "Microsoft Office Word, About shared workspaces", downloaded Jun. 18, 2009.

ClassSpot, "Tidebreak: ClassSpot Benefits—Deliver advanced interactive classrooms, simply.", downloaded Jun. 18, 2009.

ClassSpot, "Tidebreak: ClassSpot Details—The Details.", downloaded Jun. 18, 2009.

ClassSpot, "Tidebreak: ClassSpot Features", Jun. 18, 2009.

ClassSpot, "Tidebreak: Innovations.", downloaded Jun. 18, 2009.

ClassSpot, "Tidebreak: Product Concepts—Welcome to the Interaction Age.", downloaded Jun. 18, 2009.

U.S. Appl. No. 61/158,130, filed Mar. 6, 2009.

* cited by examiner

SMART NOTEBOOK

BACKGROUND

There are many settings in which individuals collaborate on ideas, projects, studying, etc. For example, meetings are held in business settings, students get together in classrooms or study sessions, etc. The meeting participants may bring a wide variety of electronic devices to the meeting. For example, a student might take notes on a laptop computer, many in the meeting may have a cellular telephone, or a group leader might use a computer to make a slide presentation. It can be desirable to allow the group members to use their electronic devices to share notes, share ideas, collaborate etc. However, there are numerous challenges with such sharing.

One challenge is to make the sharing process natural and easy. The following example will be used to illustrate some of the problems. A user can download a file from a personal computer to a portable storage device, such as a flash drive, and hand the flash drive to another person, who uploads the file to their computer. This technique suffers from numerous problems. For one, it can be very distracting to be physically passing the flash drive during a meeting. It may not even be practical to pass the device to someone who is on the other side of the room, or to pass the device to each person in the meeting. Also, there are security issues to deal with such as allowing only the desired file on the flash drive to be copied to other computers.

Some techniques provide for shared workspaces that allow users of different computers to collaborate. A shared workspace is an area where users can share documents and information, maintain lists of pertinent data, and keep each other up to date on the status of a group project. In some techniques, the shared workspace is hosted by a web server, which may be convenient when users are at different locations. However, such techniques may not allow users to have different views into the shared workspace.

Some shared workspaces allow the different users to collaborate in real-time. For example, the shared workspace allows a document, spreadsheet, or CAD drawing to be seen and modified by users at different computers. However, some real-time shared workspaces suffer from a limitation that all users see the same view, which may be referred to as "what you see is what I see" or "WYSIWIS."

SUMMARY

Techniques are disclosed herein for allowing sharing of notes and ideas between electronic devices. The techniques provide for a convenient and intuitive way to share in a collaborative setting. In one embodiment, electronic devices automatically discover one another and set up a shared workspace for the electronic devices. Thus, there is not a need for a web server or the like to set up and manage the shared workspace. Also, the automatic discovery process can determine which local electronic devices should and should not be allowed into the shared workspace such that a shared workspace can be conveniently established with a minimal amount of user intervention. The user's electronic devices may depict a representation of the shared workspace, thus showing the users who else is present and even showing their relative physical locations in the meeting.

One aspect is a machine implemented method for forming a shared workspace that includes the following steps. The presence of a number of electronic devices is determined. A determination is made that the electronic devices are to be part of a shared workspace. A shared workspace is configured for the electronic devices.

In one aspect, a computer readable storage device stores instructions which, when executed on a processor, cause the processor to implement a method that includes the following steps. A determination is made that a number of electronic devices are to be part of a shared workspace. A location of each of the electronic devices is accessed. A representation of the shared workspace that indicates the location of each of the electronic devices from the perspective of one of the electronic devices is determined. The representation of the shared workspace is presented on a display screen of one of the electronic devices.

One aspect is an apparatus having a display screen, a processor, and a computer readable storage device that stores instructions which, when executed on the processor, cause the processor to implement a method that includes the following. A determination is made that a number of electronic devices are to be part of a shared workspace. A representation of the shared workspace is generated based on capabilities of the apparatus. The representation of the shared workspace is presented on the display screen.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Techniques are disclosed herein for allowing sharing of notes and ideas between electronic devices. The techniques provide for a convenient and intuitive way to share. In one embodiment, as users gather in a meeting room and turn on their electronic devices, the devices communicate with each other and automatically establish a shared workspace for the electronic devices. The shared workspace is depicted on one or more of the electronic devices to allow the user to easily see who is presently active in the shared workspace, as well as what other members are sharing. In some aspects, the depiction of the shared workspace represents the physical environment in which the users are collaborating, which allows the users to use the shared workspace in a natural and intuitive manner.

Figure 1A:
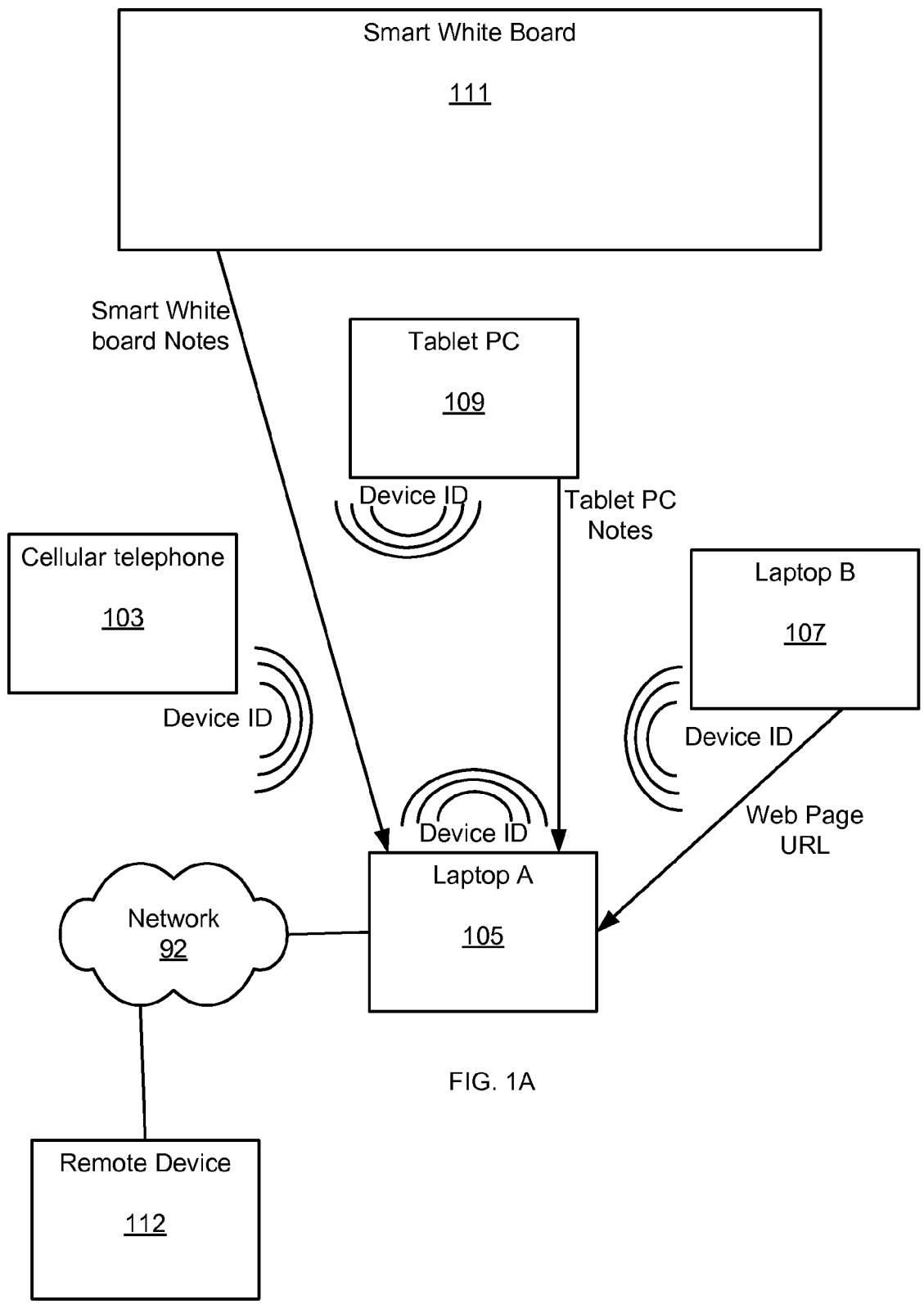
FIG. 1A depicts an example environment in which users with electronic devices are meeting to collaborate.

FIG. 1A depicts an example environment in which users with electronic devices are meeting to collaborate. In this example, there are four local users (not depicted in FIG. 1A) whose electronic devices are a cellular telephone 103, Laptop A 105, Laptop B 107, and a Tablet PC 109, and a remote user that is using remote device 112 to participate. The remote device 112 is connected to network 92, which may be the Internet, a local area network (LAN) etc. The remote user might place a telephone call (connection not depicted in FIG. 1A) in order to talk with the others. The local users might be sitting around a table, although the table is not depicted in FIG. 1A. The electronic devices are depicted as broadcasting device IDs, which is one technique for the electronic devices to discover one another and establish a virtual workspace. Note that the device IDs might be transmitted point-to-point or point-to-multipoint, as opposed to being broadcast.

In some embodiments, the device IDs are transmitted using a technique that only allows devices that are relatively near each other to discover one another. For example, short range wireless communication may be used to transmit the device IDs. As an example, short range wireless communication may cover communication over distances that are typically less than 100 meters. However, in some cases, short range wireless communication may cover a greater distance such as up to 300 meters or more. Examples of short range wireless communication include, but are not limited to, infrared, Bluetooth®, and wireless local area network (WLAN). As an example, the Infrared Data Association (IrDA) publishes numerous specifications relating to infrared communication. Examples of WLAN are a set of IEEE 802.11 standards.

The workspace can be established with a very little effort on the part of the users, and can be dynamic in that as users enter and leave the meeting, devices are added and removed from the shared workspace. Herein, when referring to "electronic devices" it will be understood that this refers to the electronic devices that are to be a part of the shared workspace.

FIG. 1A also depicts several objects (e.g., documents, files, web pages, URLs, etc.) being transferring to Laptop A 105 to represent the sharing with Laptop A 105. In this example, the Tablet PC 109 is sharing notes that the Tablet PC 109 user is taking. Laptop B 107 is sharing a web page URL that is provided by the user of Laptop B 107. The smart whiteboard 111 is transferring notes that are being taken on the smart whiteboard 111. The remote device 112 might also share on object over network 92. Other electronic devices also receive objects, but those transfers are not shown in order to not obscure the diagram. For example, Laptop B, the Tablet PC, and remote device 112 might also receive the notes from the smart whiteboard 111. The objects might be transferred directly to a device or though another device. For example, smart white board notes might be transferred to Laptop A, and then on to remote device via network 92.

The electronic devices may communicate with each other through any communication protocol and transmission medium. Typically, wireless communication is used, but wired communication may also be used. The communication may be point-to-point, point-to-multipoint or, in at least some cases, broadcast communication is used. In one embodiment, the electronic devices communicate using short range wireless communication. In some embodiments, one electronic device in the group serves as a master node that has communication channels to all other electronic devices, wherein the rest of the electronic devices communicate only with the master node. However, additional communication channels between the other electronic devices could be used.

The shared workspace may be hosted by one or more of the local electronic devices or a server, for example. At least some of the electronic devices may have a shared workspace software program that controls the discovery of the devices and subsequent formation of the shared workspace. The program may be a standalone program or a plug-in, as two examples. For example, the program might be a plug-in to a calendar program, a word processing program, etc. The program may store configuration information for the shared workspace, such as user permissions, devices in the shared workspace, communication settings, etc. Thus, the shared workspace program is able to manage the shared workspace. Therefore, a server or the like is not required to control the shared workspace, but may be used.

The electronic devices in Fig. 1A are examples and are not intended to be limiting. The Tablet PC 109 is a portable electronic device that has a touchscreen or graphics tablet that allows user input via a stylus, digital pen, fingertip, etc. The graphics tablet (or digitizing tablet, graphics pad, drawing tablet) is a computer input device that allows the user to hand-draw images and graphics. The Tablet PC 109 may have handwriting recognition software, such that a text version of the handwriting may be stored and even transmitted to other electronic devices.

The smart whiteboard 111, which may also be referred to as an interactive whiteboard, has technology that captures what is written or drawn on a surface of the board 111. The smart whiteboard 111 may include software that analyzes the handwriting and translates it to text. The text may be stored in memory within the smart whiteboard 111, as well as transmitted to another device. In various embodiments, the board surface may be written on with a marker, stylus, finger, or any type of pointing device. Thus, in some cases, the surface is written on, but can be cleaned and re-used. In other cases, no marks are made on the surface, but the smart whiteboard 111 is able to sense what is being written with, for example, a stylus, and generate a representation of what is sensed on a display screen. Thus, the surface of the smart whiteboard 111 may be a display screen.

The sensing technology that the smart whiteboard 111 may use to track interaction on the surface includes, but is not limited to, resistive, electromagnetic, infrared optical, laser, ultra-sonic, and camera-based (optical). Resistive touchscreens may be composed of two flexible sheets coated with a resistive material and separated by a thin air gap. When contact is made to the surface of the touch screen, the two sheets are pressed together, registering the location of the touch. Resistive technology allows one to use a finger, a stylus, or any other pointing device on the surface of the board 111. Optical and infrared technology may use triangulation to determine the location of a marker or stylus. Thus, optical and infrared technology allows the smart whiteboard 111 to be made of any material. Electromagnetic whiteboards 111 feature an array of wires embedded behind the board surface that interact with a coil in the stylus tip to determine the (x, y) coordinate of the stylus. Capacitive whiteboards 111 work with an array of wires behind the board 111. If a person uses their finger to touch the screen, the wires detect a change in capacitance to calculate an (x, y) coordinate.

Figure 1B:
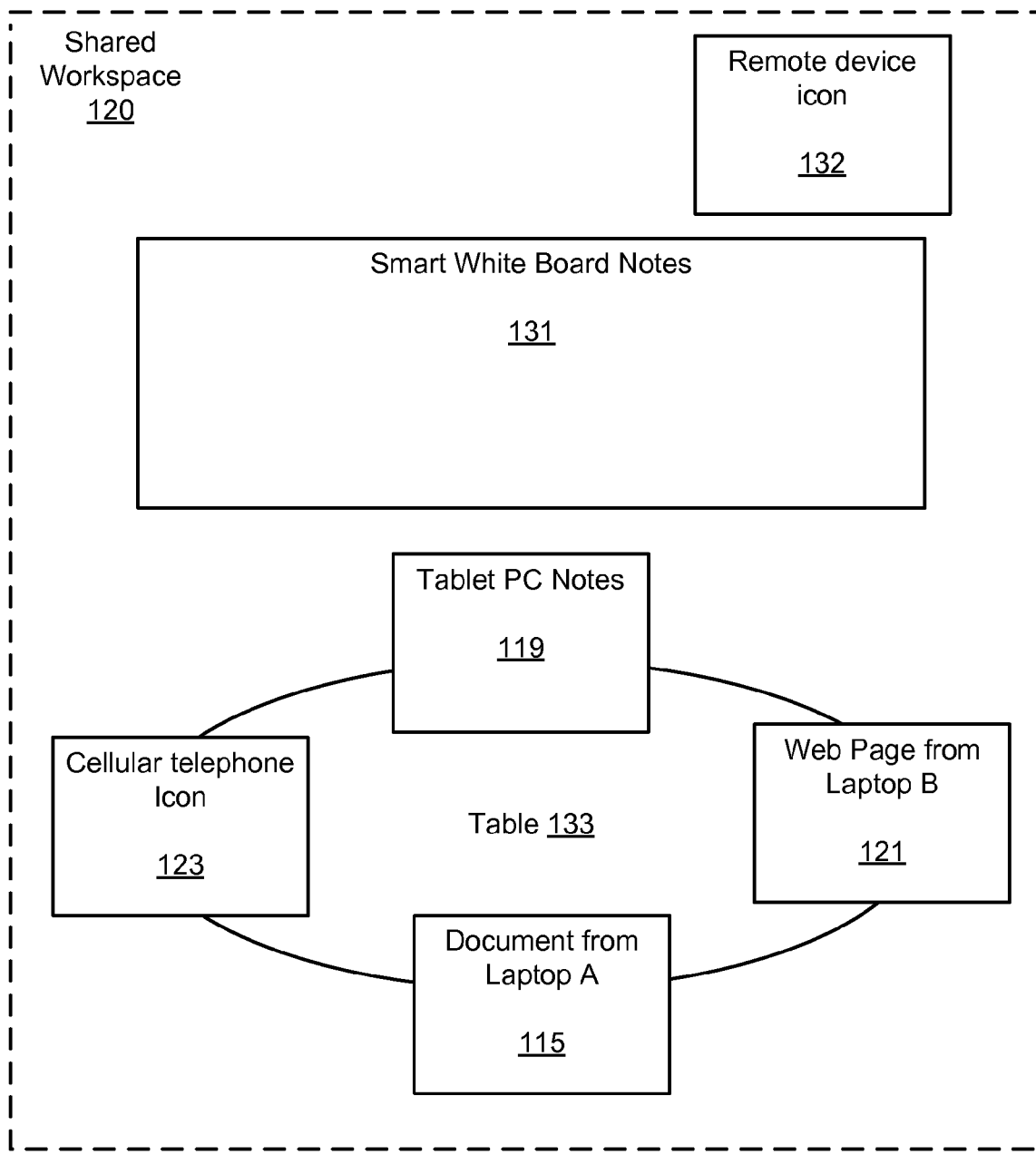
FIG. 1B depicts one embodiment of a shared workspace that is displayed on one of the electronic devices.

FIG. 1B depicts one embodiment of a shared workspace 120 that is displayed on one of the electronic devices. The shared workspace 120 allows the users to share objects and to collaborate on them together. In this example, the shared workspace 120 is what is displayed on Laptop A 105. The shared workspace 120 contains elements related to four local electronic devices, the remote device 112, and the smart whiteboard 111. In this example, the shared workspace 120 reflects the physical locations of the local electronic devices in the environment. Specifically, four users with electronic devices are depicted as gathered around a table 133. The remote device 112 is set off to the top to indicate a remote participant. Note that it is not required that the shared workspace 120 reflect the physical location of the users or their environment. The workspace 120 is depicted from the perspective of the user of Laptop A 105 ("User A"). Thus, if User A were to look to the left, User A would see a user whose electronic device is a cellular telephone.

The shared workspace 120 depicts an element for each local and remote electronic device. Note that some of the electronic devices may be associated with a specific user, whereas other are not. For example, the smart white board 111 might not be associated with a particular user. Although clearly in some cases, the smart white board 111 might be associated with a user such as a teacher, group leader etc. Some of the users (or devices) are currently sharing with the group and hence the shared workspace 120 depicts elements to represent the object (e.g., document, notes, URL) being shared. The elements being shared correspond to what is being transferred to Laptop A 105 in FIG. 1A. For example, the Tablet PC 109 is currently sharing notes with the group, and hence an element to represent Tablet PC notes 119 is displayed. This element might be a file that the can be accessed and edited, but that is not required. The element 119 might simply be an image of the Tablet PC notes, such that User A can view the notes. The user at Laptop B 107 is sharing a web page 121, which Laptop A 105 could view by receiving the URL and accessing with a browser application. Alternatively, Laptop B 107 might transfer a copy of the web page. The user of the cellular telephone 103 is currently not sharing an object with the group. However, a cellular telephone icon 123 may be displayed to indicate that user's presence in the group. There is an icon 132 to depict the remote device 112. Other information, such as user names may appear in the shared workspace 120. One region of the shared workspace 120 shows the smart whiteboard notes 131. User A at Laptop A is sharing a document and hence element 115 represents the document from Laptop A.

In some embodiments, the users are allowed to "zoom in" to take a closer look at the objects being shared. For example, User A might move a "cursor" to the element 121 of the workspace 120 depicting the web page and click on the web page to cause the web page to expand in size. Techniques for changing the level of image detail to allow zooming in and out are described in U.S. Pat. No. 7,133,054, titled "Methods and Apparatus for Navigating an Image," filed Mar. 17, 2004; Published U.S. Patent 2006/0267982, titled "System and Method for Exact Rendering in a Zooming User Interface," filed May 22, 2006; Published U.S. Patent 2008/0050024, titled "Method for Encoding and Serving Geospatial or Other Vector Data as Images, filed Sep. 19, 2007; and Published U.S. Patent 2007/0104378, titled "Method for Encoding and Serving Geospatial or Other Vector Data as Images, filed Dec. 29, 2006; all said patent documents are hereby incorporated herein by reference for all purposes. Note that techniques other than those described in the foregoing patent documents may be used for zooming in and out, as well as other rendering effects.

In some embodiments, a user may give permission to other users to edit a document being shared. For example, User A is sharing a document. By sharing the document, a copy of that document may be transferred to the electronic devices of other users. Note that some users might not get a copy because their device may not be able to work with the document. For example, the cellular phone 103 might get a bitmap image of the document instead. If given permission, User B may edit the document at Laptop B 107. A synchronization process may be used to synchronize differences between the version of the document at Laptop A 105 and Laptop B 107. It is not required that a synchronization process be used maintain the document being edited.

The following example will be used to illustrate how the shared workspace 120 of FIG. 1B might be used; however, this example should not be viewed as being limiting. The shared workspace 120, in the implementation of FIG. 1B, is based on the physical environment in which the users are collaborating. For example, the shared workspace 120 depicts a table 133 in a conference room with indicators 115, 119, 121, 123 of where each participant is sitting (at least where their electronic device is located). In this example, the indicators include an object being shared or an icon to represent the user. This provides for a very natural way for users to collaborate. If User A wishes to take a close look at the notes 119 that are being entered by the Tablet PC 109 user, User A knows where the Tablet PC 109 user is sitting and can quickly locate the notes 119 in the shared workspace 120.

In the example of FIG. 1B, the shared workspace 120 represents all of the electronic devices in the meeting. However, in some cases this may not be practical either due to the large number of devices in the meeting or the relatively limited capabilities of the electronic device. For example, a cellular telephone's limited size display screen might only display one object at a time. Alternatively, the cellular telephone 103 display might display multiple objects, but depict the objects at a reduced size. If the workspace 120 represents the physical space, then the cellular telephone 103 user can quickly locate a given workspace 120 object, even if the object is not current being displayed.

Figure 1C:
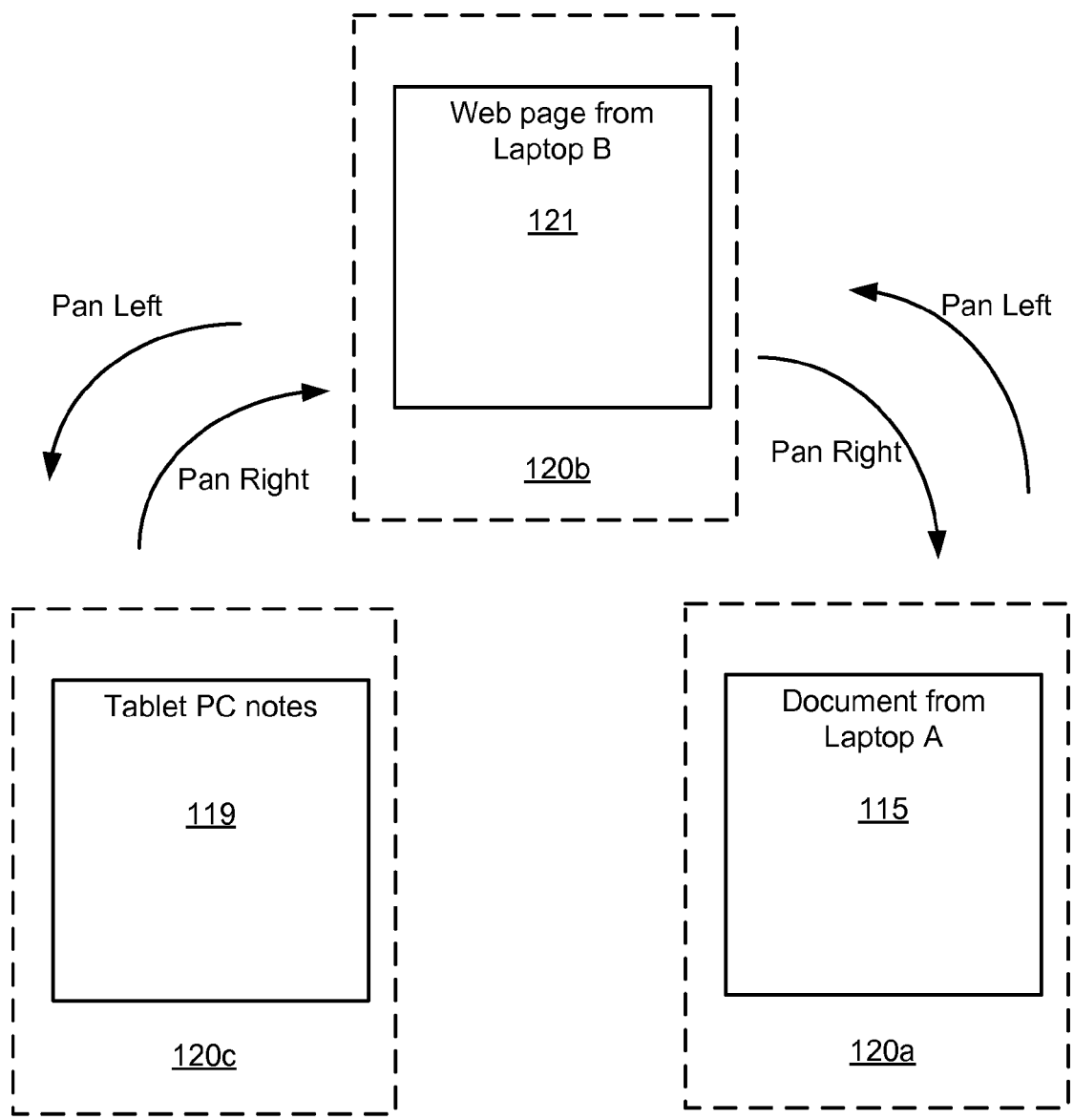
FIG. 1C depicts one embodiment of three instances of shared workspaces that are viewed at the cellular telephone at different times by panning.

FIG. 1C depicts one embodiment of three instances of shared workspaces 120*a-c* that are viewed at the cellular telephone 103 at different times by panning around. For example, at a given point in time, virtual workspace 120*b* depicts the web page from Laptop B 107, which is across the table 133 from the cellular telephone user. Because the cellular telephone user knows that User A is sitting to the right of the cellular telephone user, the cellular telephone user can quickly pan to the right to find User A's object 115 in workspace 120*a*. The cellular telephone user can also pan to the left to view the Tablet PC notes 119 in workspace 120*c*. The user might pan also to view the smart white board notes 131 or remote device icon 132. Thus, the user is allowed to pan left and right (or up/down, etc.) to change the view of the workspace 120. As the foregoing indicates, the way in which the workspace 120 is presented at a device may be based on the device's capabilities.

In some implementations, the shared workspace 120 has indicators for more than a single electronic device, but less than all of the electronic devices that are in the shared workspace. For example, the shared workspace might depict the web page 121 from Laptop B and icons to depict some, but not all, of the other electronic devices.

Figure 2:
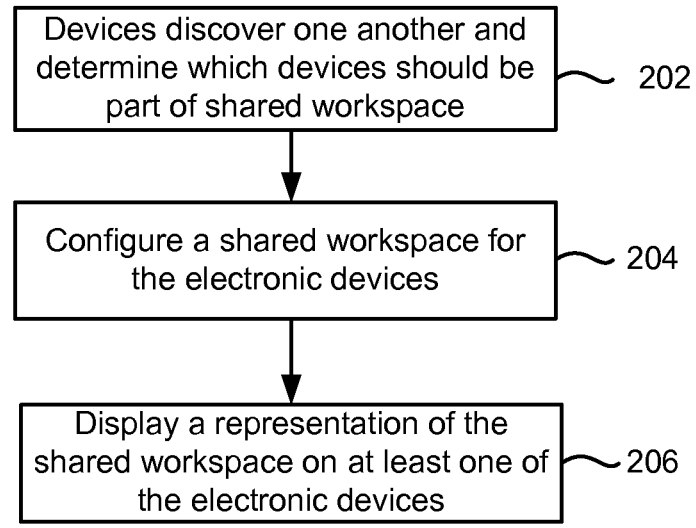
FIG. 2 is a flowchart of one embodiment of a process of configuring a shared workspace.

FIG. 2 is a flowchart of one embodiment of a process 200 of configuring a shared workspace 120. In one implementation, process 200 is implemented by executing instructions on a processor. For example, Laptop A 105 may execute steps of process 200 by communicating with other electronic devices. In some cases, each electronic device separately executes steps of process 200. In some implementations, a given device implements only a subset of steps in process 200. For example, one device may act as a master node that performs certain steps for other devices.

In step 202, electronic devices discover one another and determine which ones should be part of the shared workspace 120. For example, as users enter a meeting room, the various electronic devices discover one another by broadcasting devices IDs. Based on the device IDs the electronic devices determine which ones are to be part of a collaborative group. Further details are described in process 300 of FIG. 3.

In step 204, a shared workspace 120 is generated for the electronic devices. The shared workspace 120 allows the devices to share objects such as application files, web page, etc. Step 204 may include one or more of the electronic devices in the group storing configuration information that is used in managing the shared workspace 120. Further details are discussed in connection with process 400 of FIG. 4.

Figure 7A:
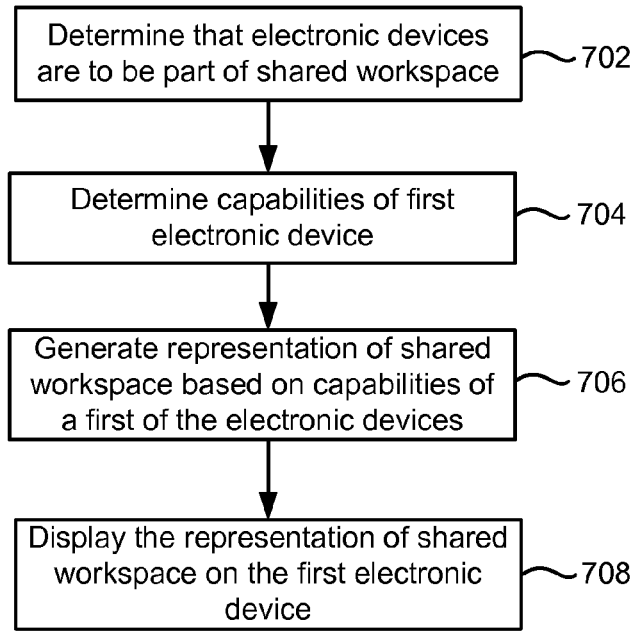
FIG. 7A depicts one embodiment of a process for generating a representation of a shared workspace based on capabilities of devices in the shared workspace.
Figure 7B:
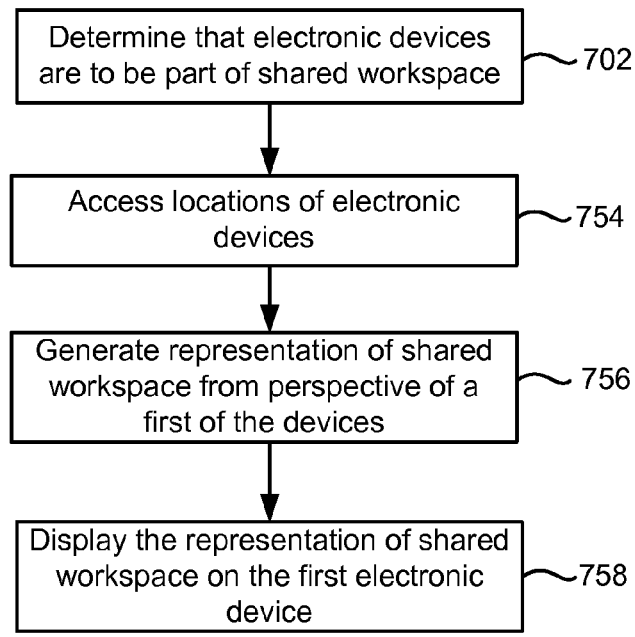
FIG. 7B depicts one embodiment of a process for generating a representation of a shared workspace based on capabilities of devices in the shared workspace.

In step 206, a representation of the shared workspace 120 is displayed on at least one of the electronic devices. Initially, there may not be any objects being shared; however, an icon might be displayed for each electronic device in the group. The icons may reflect the physical location of each electronic device, but that is not required. FIGS. 1B and 1C depict example workspaces 120 that can be displayed on an electronic device. FIGS. 7A and 7B depicts two different embodiments of processes for generating and displaying a representation of a shared workspace.

Figure 3A:
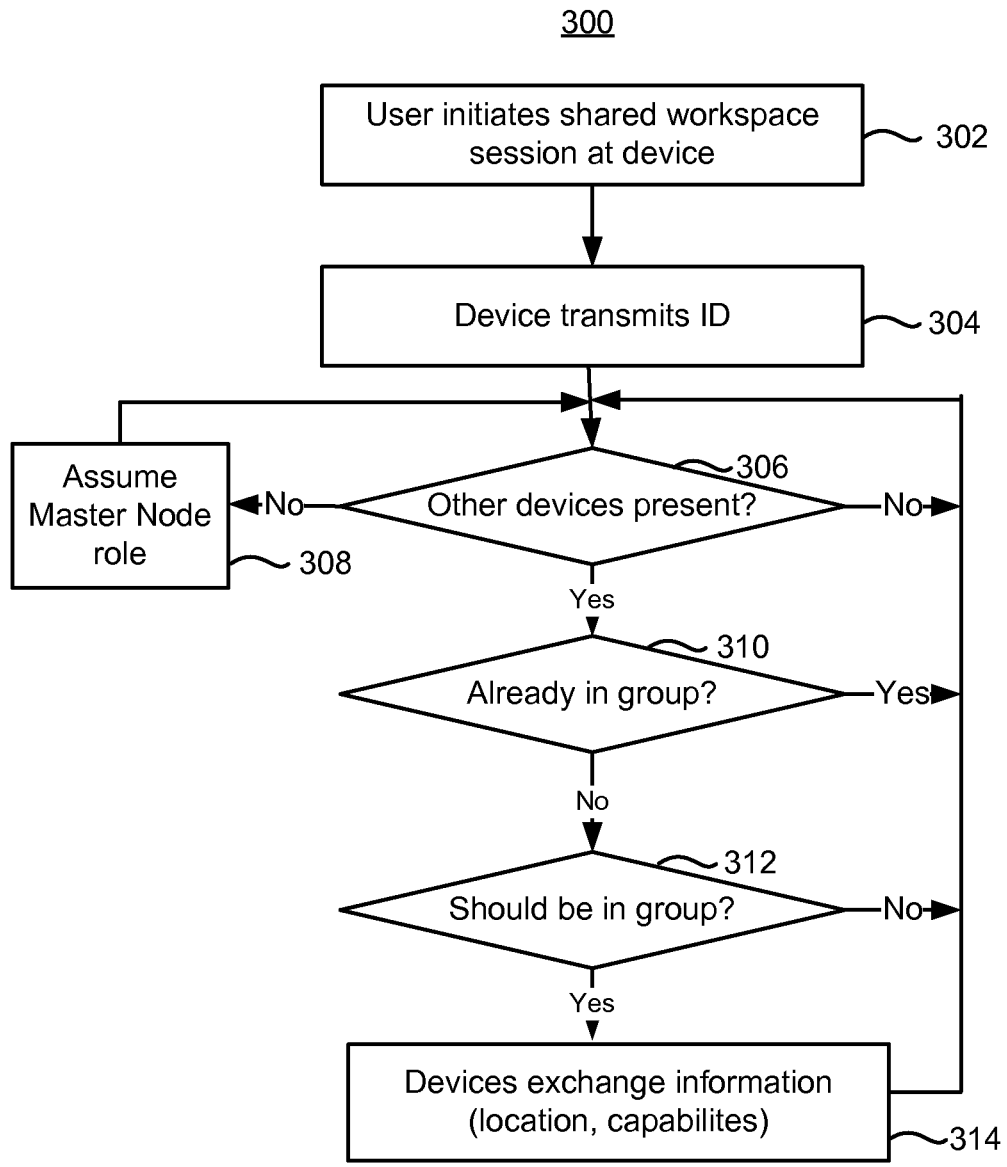
FIG. 3A depicts a flowchart illustrating a process of discovering devices and determining what devices should be part of a shared workspace.

FIG. 3A depicts a flowchart illustrating a process 300 of discovering electronic devices and determining what devices should be part of a shared workspace 120. Process 300 is one implementation of step 202 of process 200. In step 302, a user initiates a shared workspace session at a first device. For purposes of illustration, process 300 will be described from the perspective of actions at Laptop A 105; however, it will be appreciated that other electronic devices could perform these actions instead. To initiate the session, User A may open a shared workspace software program on Laptop A 105. The shared workspace program is capable of instantiating and managing the shared workspace 120. Upon opening the shared workspace program, the program may automatically initiate certain steps of process 300, such as broadcasting its device ID and discovering other electronic devices, although this is not required. The user may be requested to enter information such as a name for the shared workspace 120, a User ID, password, etc. However, some of this information may be learned implicitly by the shared workspace program. For example, the shared workspace program may communicate with a calendar program to determine that the user is expected to be in a particular meeting at this time, thus inferring information therefrom.

In step 304, Laptop A 105 broadcasts its device ID such that if there are already any other electronic devices active for the shared workspace group they will become aware of Laptop A 105. The device ID can be any convenient identifier such as a MAC address, a user ID, etc.

In step 306, Laptop A 105 determines whether any other electronic devices are currently present. For example, Laptop A 105 listens for a device ID of other devices. In some embodiments, a determination is made as to whether the other device is within short range wireless communication range. This is one technique for determining whether the other device is in close physical proximity.

If no other electronic devices are present, then Laptop A 105 may assume a master node role in step 308. For purposes of discussion, Laptop A will be discussed as taking a master node role, but this is not a requirement. Next, Laptop A 105 continues to listen for other devices in step 306.

If in step 306, Laptop A 105 detects a device ID from another device, then Laptop A 105 determines whether the electronic device is already part of the shared workspace group (step 310). If the electronic device is already part of the group, then no action is necessary. If the electronic device is not yet part of the group, process 300 continues at step 312.

In step 312, Laptop A 105 determines whether the new electronic device should be a part of the shared workspace 120. In one embodiment, the devices perform an authentication process with each other to verify group membership. Laptop A 105 might have a list of users (or devices) that are permitted in the group and perform an authentication process to determine whether to allow the other device to join the shared workspace 120. In some embodiments, this list is learned implicitly by, for example, communicating with a calendar program to determine who should be in the meeting. The list could also be manually entered at any time. If the new device is not recognized, the shared workspace program might issue an onscreen prompt to ask User A if the new device should be permitted into the shared workspace. If it is determined that the new device should not be a part of the group, then process 300 returns to listening for other devices in step 306. Laptop A 105 might send a warning message to any current members of the group that an unauthorized device is present if authentication failed.

If the new device is to be added to the shared workspace 120, then the devices exchange information such as their locations and capabilities (step 314). The location information can later be used to generate a shared workspace 120 that depicts physical locations of electronic devices. The capabilities information can be later used to determine what type of information should be transferred to the other device. For example, the other device might receive an application file or an image that represents the content of the application file, depending on whether or not the device is capable or processing the application file.

Process 300 will now be described from the perspective of a device that is not the first to initiate the shared workspace 120. As an example, this might be User B at Laptop B 107 starting a shared workspace program upon entering a meeting room. In step 302, User B initiates a shared workspace session at Laptop B 107. This may include User B opening a shared workspace software program in a similar manner to User A opening a shared workspace program. In one embodiment, upon opening the shared workspace software program, process 300 automatically continues at step 304 in which case the device broadcasts its device ID. In step 306, Laptop B 107 determines that Laptop A 105 is already present and proceeds with step 310 to authenticate with Laptop A 105. In some embodiments, Laptop A 105 assumes a master node role and controls the authentication process. After determining that Laptop A 105 and Laptop B 107 should each be part of the group (step 312), the devices exchange information (e.g., capabilities, location) in step 314. It is not required that this information be stored at both Laptop A 105 and Laptop B 107, but the configuration information may be stored at multiple devices.

When the user of the Tablet PC 109 enters the meeting, that user may also open a shared workspace program that may reside on Tablet PC 109 (step 302). As with other devices, the Tablet PC 109 broadcasts its device ID (step 304). The Tablet PC 109 determines that Laptop A 105 and Laptop B 107 are present (step 306). The Tablet PC 109 might be informed that Laptop A 105 is the master node in which case Laptop A takes the lead in authenticating and other steps. Laptop A 105 determines that the Tablet PC 109 is not yet a part of the group (step 310) and authenticates with the Tablet PC 109 (step 312). Then, Laptop A 105 and the Tablet PC 109 exchange information (step 314). This information may be shared with Laptop B 107.

Adding the cellular telephone 103 to the shared workspace 120 may proceed in a similar manner to adding the other devices. Note that it is not required that each electronic device store a copy of a shared workspace program. For example, the cellular telephone 103 might not have a shared workspace program. Instead the cellular telephone 103 might rely on a device such as Laptop A to contact it, request information, and send it files occasionally.

Figure 3B:
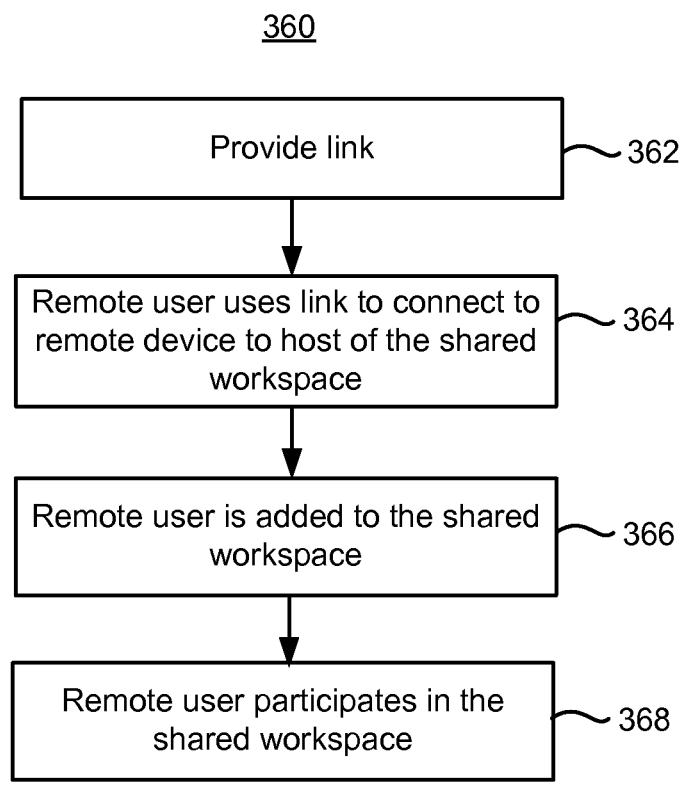
FIG. 3B depicts one embodiment of a process for adding a remote user to the shared workspace.

FIG. 3B depicts one embodiment of a process 360 for adding a remote user to the shared workspace. As previously mentioned, the shared workspace may be hosted by one or more of the electronic devices that are a part of the shared workspace, or another device such as a server. In step 362, a link to the shared workspace is provided to the remote user. The link may be provided by numerous techniques including, but not limited to, the following. A link to the shared workspace may be posted on a website, sent to the remote user via electronic mail, or associated with an electronic meeting invite. An example of an electronic meeting invite is an invitation sent via a messaging and collaboration client such as Outlook® messaging and collaboration client, which is available from Microsoft Corporation of Redmond, Wash.

In step 364, the remote user uses the link to establish a connection to a device that is hosting the shared workspace. For example, the user might enter the link into a web browser to connect to a server that is hosting the shared workspace. However, note that it is not required that a server host the shared workspace. It is not required that the remote device 112 have any special shared workspace software to establish the connection. The remote device 112 might be sent software, such as a lightweight client, to perform certain tasks such a render an image of the shared workspace and assist with data transfers to/from the device that is hosting the shared workspace.

In step 366, the remote device 112 is added to the shared workspace. For example, an icon 132 of the remote device is added to the shared workspace 120 that is rendered at the other electronic devices. In some embodiments, the remote user is authenticated prior to adding to the shared workspace. The remote device may be queried for information such as display capabilities, etc, which may be stored at the host device.

In step 368, the remote user participates in the shared workspace. For example, the remote user share objects with others in the shared workspace by data transfers to/from the host device.

Figure 4:
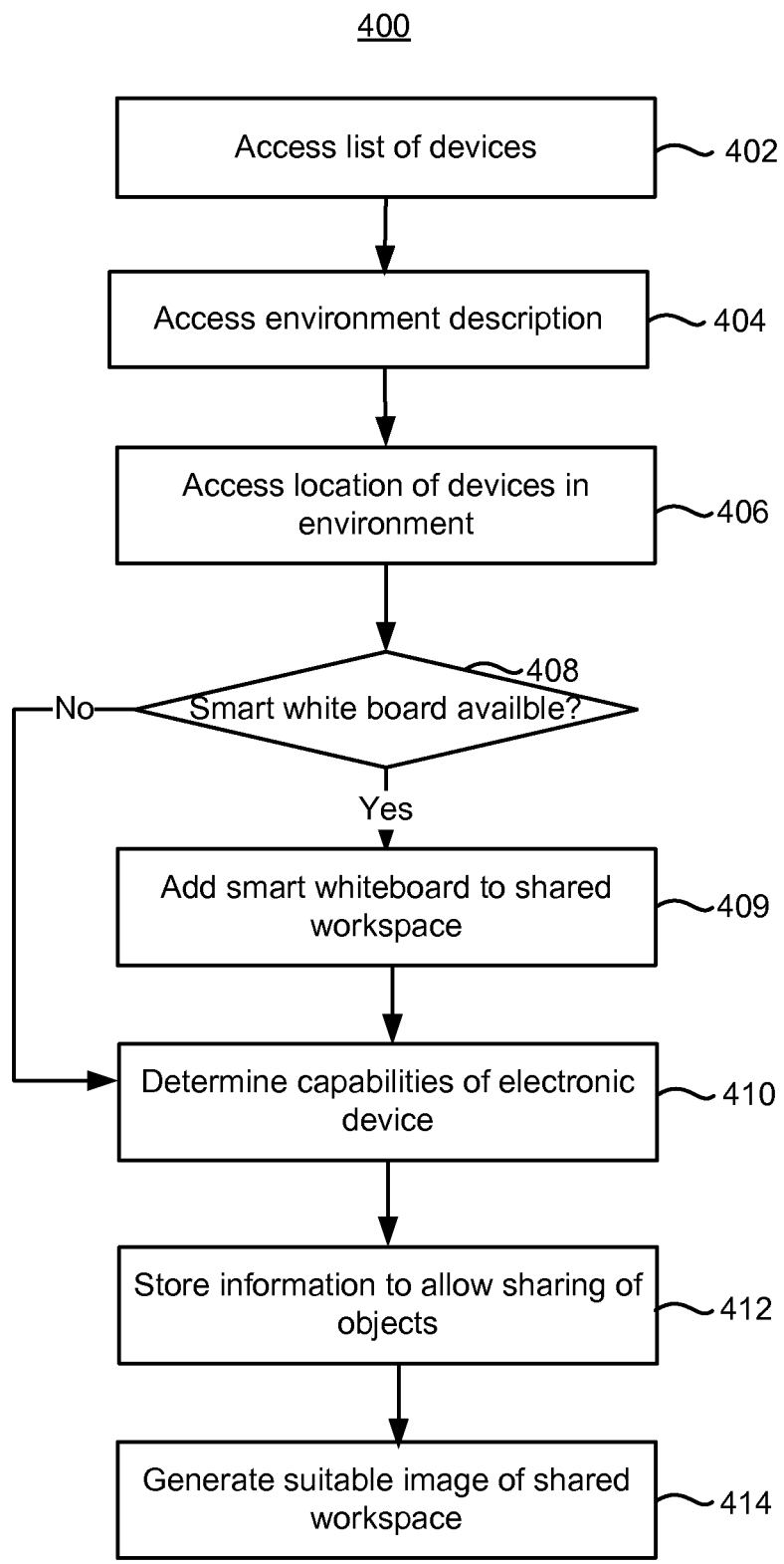
FIG. 4 depicts one embodiment of a process of generating a shared workspace.

FIG. 4 depicts one embodiment of a process 400 of generating a shared workspace 120. Process 400 is one implementation of step 204 of process 200. In this example, the shared workspace is based on information about the environment and the location of the electronic devices in the environment. However, this is not a requirement; hence it will be understood that not all steps of process 400 are required. Process 400 may be implemented on any of the electronic devices. In some implementations, multiple devices in the group perform this process 400. For example, all devices could run their own software program to generate a shared workspace 120. However, it is possible for one device to perform the process 400 and send information needed to display the shared workspace 120 on the other device. For the sake of discussion, an example of Laptop A 105 performing process 400 will be used.

In step 402, a list of electronic devices in the shared workspace 120 is accessed. This list may be generated from step 202 of process 200. In step 404, a description of the environment is accessed. In one embodiment, the configuration of the room is stored in a database that is accessible to the shared workspace program. The identity of the room can be learned in a number of ways. For example, if the users set up the meeting using a calendar program, the calendar program may indicate the meeting time and room. The shared workspace program may communicate with the calendar program to learn the room number. Thus, the room number could be inferred by accessing the user's calendar and determining that the user is expected to be in a certain room at that time. Then, the shared workspace program accesses a database, possibly through a local area network, to obtain the room configuration. Of course, the room number could be learned in another manner, such as the user entering the room number. As another example, the room might be equipped with an RFID tag, which can be read to determine the room number.

In step 406, the location of each of the electronic devices is accessed. This is an optional step. The electronic device's locations may be determined in a variety of ways. For example, an electronic device might have a RFID tag in it that allows its position to be determined by an RFID reader at a known location in the room. Alternatively, the user might enter information that describes the location, such as a seat number. This location information can be passed between electronic devices during the device discovery process 300.

In step 408, a determination is made as to whether a device such as a smart whiteboard 111 is in the environment. If so, the smart whiteboard 111 is added to the shared workspace 120 in step 409. Adding the smart whiteboard 111 may include storing an indicator that the smart whiteboard is available such that an icon or other element can be added to the representation of the shared workspace that is displayed. Also, a reminder may be stored to request notes from the smart whiteboard 111 periodically. The smart whiteboard 111 is an example of a device that typically would not be brought into the meeting by a user. Other devices than a smart whiteboard 111 could also be added to the shared workspace in step 408. In one embodiment, the devices that are added to the shared workspace 120 in step 408 are those that are not associated with a particular user. However, note that the smart white board and/or a device that is not associated with a particular user could be added to the shared workspace 120 during process 300.

In step 410, a determination is made as to the capabilities of this electronic device. For example, the screen size, rendering capabilities, and input capabilities are determined. Therefore, the shared workspace 120 can be adapted to the capabilities of the electronic device. As one example, the workspace program on Laptop A 105 determines the capabilities of Laptop A 105. As another example, the workspace program on Laptop A 105 performs at least some of the workspace management for other devices. In this case, the workspace program on Laptop A 105 determines the capabilities of another device such as the cellular telephone 103. This information may have been passed during step 314 of process 300.

In step 412, configuration information for the shared workspace 120 is stored. In the present example, the configuration information is stored at Laptop A 105. If Laptop A 105 is serving as a master node, at least some of the configuration information may be transferred to other devices, but that is not required. The configuration information may include any of the information learned so far, such as the electronic devices in the group, capabilities of each electronic device, device locations, etc. In some implementations, communication channels are established between electronic devices such that files and data may be passed between electronic devices. At this point, it is assumed that no electronic device has shared an object such as a document file yet. Process 500 below will describe adding an object to the shared workspace 120.

In step 414, a suitable image is generated for the shared workspace 120. For example, an image depicts a table 133 with icons representing four electronic devices around the table is generated. There may also be a place for an icon for a smart whiteboard 111 and/or remote devices 112. The image is displayed on at least one of the electronic devices taking part in the shared workspace. For example, Laptop A 105 displays the shared workspace 120. Laptop A 105 may also generate a suitable image for another electronic device and transfer that image to the other device. Each image may be rendered from the perspective of the device displaying the shared workspace 120.

Figure 5:
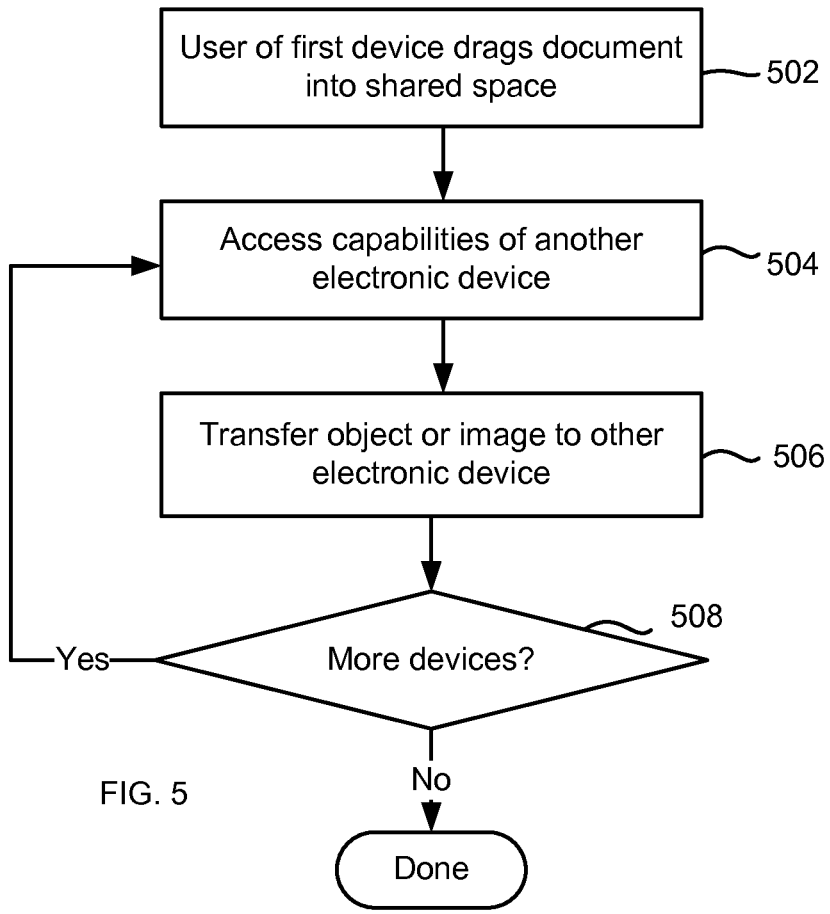
FIG. 5 depicts one embodiment of a process of adding objects to a shared workspace.

FIG. 5 depicts one embodiment of a process 500 of adding objects to a shared workspace 120. Process 500 may be performed by any of the electronic devices in the group. The object to be shared could be a file such as an application file, web page, a URL. However, note that sharing an object does not necessarily mean that a copy of the object is transferred. For example, when Laptop A 105 shares a document, a copy of the document might be transferred to Laptop B 107, but a bitmap image of the document might be transferred to the cellular telephone 103.

In step 502, a user drags on object to be shared into a region of the display screen that causes objects to be shared. In one implementation, the user simply drags the object into a certain region of the screen that displays the shared workspace 120. However, the object could be dragged into a different region.

In step 504, the electronic device accesses the capabilities of other electronic devices to determine what to transfer to another electronic device in the group that is to receive an update. For example, Laptop A 105 determines that Laptop B 107 has the capability to edit a text document. Therefore, Laptop A 105 determines the Laptop B 107 should be transferred a copy of the text document. In one embodiment, first a check is made to determine whether User A grants permission to User B to edit the text document. That is, a copy of the text document could be transferred to look at, but User B could not edit the document (at least User B could not affect the copy located at Laptop A 105). As another example, Laptop A 105 determines that the cellular telephone 103 is not able to edit the text document. Therefore, the cellular telephone 103 might be transferred a bitmap image of the text document.

In step 506, an object is transferred to the other device to update its shared workspace 120. If there are more electronic devices in the workspace 120 (step 508), then process 500 continues at step 504. Otherwise, process 500 concludes.

Figure 6A:
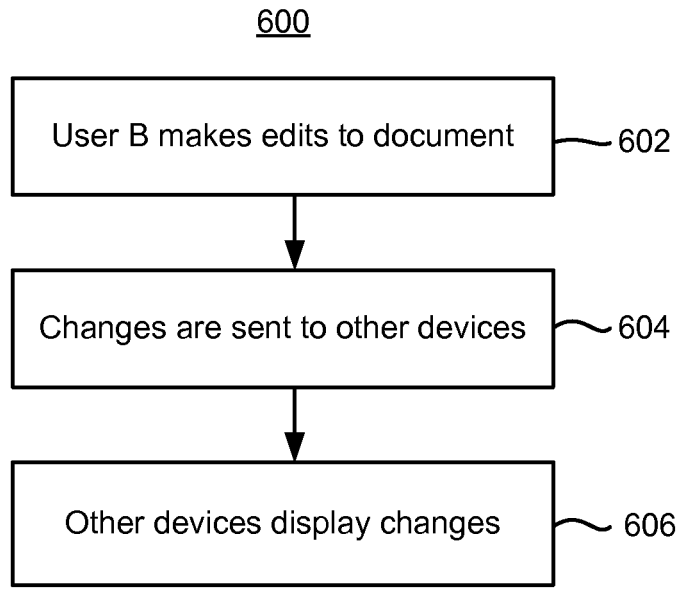
FIG. 6A depicts one embodiment of a process for editing a document in a shared workspace.

FIG. 6A depicts one embodiment of a process 600 for editing a document in the shared workspace 120. Process 600 refers to an example in which User B (at Laptop B 107) edits a document that User A shared. However, the principles can be applied to other situations. Process 600 may begin at any point after User A has added the document to the shared workspace 120. In step 602, User B makes edits to the copy of the document that exists at Laptop B 107. For example, Laptop B 107 has a word processing program that is used to edit the text document.

In step 604, changes made by User B are sent to other electronic devices. The manner in which changes are made may depend on how the document is currently being displayed at other devices. For example, Laptop B 107 and Laptop A 105 may undergo a synchronization process to synchronize the versions of the text document at Laptop A 105 and Laptop B 107. Afterwards, a version of the text document at the Tablet PC 109 may be synchronized. On the other hand, if the cellular telephone 103 is displaying a bitmap image, then a new bitmap image might be sent. If Laptop A 105 is functioning as a master node, Laptop A 105 might handle the updates to the Tablet PC 109 and the cellular telephone 103. However, the electronic device that made the changes (Laptop B 107 in this example) could initiate the updates instead.

Note that the frequency with which the edits are sent can vary widely from one implementation to the next. It is of course possible for two users to make edits to different versions of the document between synchronizations. In such a case, a priority scheme may be used to determine which edits take precedence. As an example, any conflicts to edits made by User A and User B can be resolved in favor of the document owner (e.g., User A). Also, note that it is not required that a synchronization process be used. In one implementation, the edits are made to the shared document by Laptop B 107 transferring commands to Laptop A 105 that instruct what changes are to be made.

In step 606, the electronic devices display the updated version of the document. Note that not all devices need to receive and display the updates. For example, if the cellular telephone 103 is currently displaying the web page from Laptop B 107 (and not the document being edited), then the changes need not be sent to the cellular telephone 103.

Figure 6B:
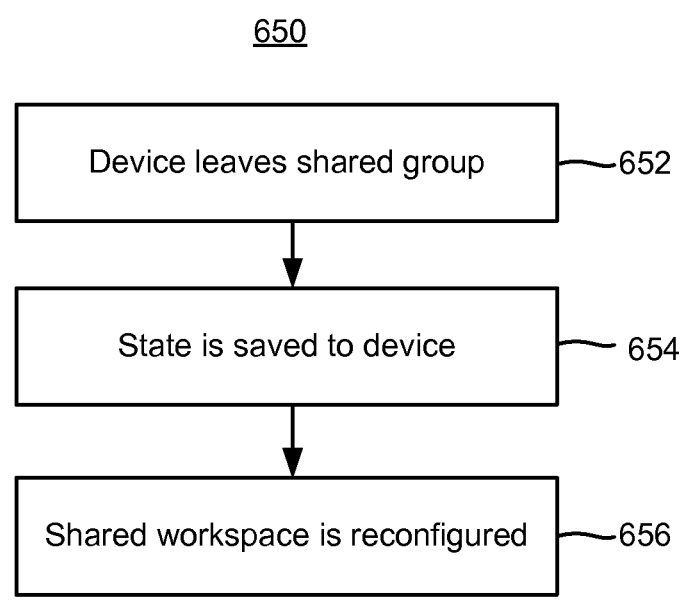
FIG. 6B depicts one embodiment of a process of an electronic device leaving a shared workspace.

FIG. 6B depicts one embodiment of a process 650 of an electronic device leaving a shared workspace 120. Process 650 refers to an example in which User B (at Laptop B 107) leaves the shared workspace. However, the principles can be applied to other situations. Process 650 may begin at any point. In step 652, User B initiates steps to leave the shared workspace, such as inputting a request to the shared workspace program. In response to this, Laptop B sends a message to at least the master node, and possibly all electronic devices, that Laptop B is leaving the shared workspace. In another alternative, electronic devices are active in the shared workspace so long as they are transmitting a certain signal such as their device ID (or transmit the signal within a certain timeout period). Thus, Laptop B simply stops transmitting this signal to leave the shared workspace.

In step 654, a state of the shared workspace is saved to Laptop B. The state may include any of the objects that are being collaborated on. User B may be provided an option as to which objects to save; however, objects could also be automatically saved. Thus, the latest version of the document from Laptop A could be saved at Laptop B. Whether this document is saved may be conditioned upon permission from User A at Laptop A. For example, when User A initially shared the document, User A might have specified that other users could not save the document. The state information could include other information, such as which users took part in the meeting. In one aspect, the version of the state that is saved is based on the capabilities of the electronic device. For example, a cellular telephone may not have much memory so it may be desirable to limit what is saved.

In step 656, the shared workspace 120 is re-configured to reflect Laptop B leaving. For example, any objects that were being shared by Laptop B might be removed from the shared workspace 120. However, there may be an option that allows objects from Laptop B to continue to be shared after Laptop B leaves the group. Reconfiguring the shared workspace may include re-sizing and re-scaling the representation of the shared workspace 120 at the other electronic devices.

FIG. 7A depicts one embodiment of a process 700 for generating a representation of a shared workspace 120 based on capabilities of electronic devices in the shared workspace 120. In step 702, a determination is made that certain devices should be part of the shared workspace 120. In general, process 300 can be used to make this determination.

In step 704, the capabilities of the electronic device upon which the workspace 120 is to be presented is determined. For example, Laptop A 105 determines its own capabilities or is sent the capabilities of the cellular telephone 103.

In step 706, a representation of a shared workspace 120 is generated based on the device capabilities. For example, for Laptop A 105 the workspace 120 might depict all of the devices in the group, whereas for the cellular telephone 103 the shared workspace 120 might be more limited.

In step 708, the representation of the shared workspace 120 is displayed on the electronic device.

FIG. 7B depicts one embodiment of a process 750 for generating a representation of a shared workspace 120 based on locations of electronic devices in the shared workspace 120. In step 702, a determination is made that certain devices should be part of the shared workspace 120. In general, process 300 can be used to make this determination.

In step 754, the locations of the devices upon which the workspace 120 is to be presented is determined. For example, Laptop A 105 determines its location and is sent the location of the other devices. The other devices may send their locations during step 314 of process 300.

In step 756, a representation of a shared workspace 120 is generated based on the device locations. Laptop A 105 might generate the representation not only for itself, but for other devices. Each representation is from the perspective of the device on which the workspace 120 will be displayed.

In step 758, the representation of the shared workspace 120 is displayed on the electronic device. For example, for Laptop A 105 the workspace 120 might resemble that of FIG. 1B. Note that a location based shared workspace 120 representation can also include the example of FIG. 1C, in which the workspace 120 is limited to showing information from one device at a time. However, by panning right or left, the user is allowed to move in the workspace 120; hence, it is location-based. In one implementation, location based generation of the representation of the shared workspace is combined with device capability based generation.

Note that it is possible to have multiple shared workspaces ongoing in the same room or other region in which the electronic devices of different shared workspace groups are in close physical proximity to each other. In such a case, electronic devices from one group can be securely kept from eavesdropping on the other group by a variety of techniques such as encrypting transmissions. The configuration of the groups can be kept separate by only allowing electronic devices with the correct device ID (or user ID, password) to take actively take part in the group.

In various embodiments, the electronic devices execute computer readable instructions that are stored on computer readable media. For example, process 200, 300, 360, 400, 500, 600, 650, 700, and/or 750 may be implemented by executing, on a processor, instructions that are stored on a computer readable storage medium. Computer readable media can be any available media that can be accessed by the electronic devices. By way of example, and not limitation, computer readable media may comprise computer storage media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the computer readable instructions and which can accessed by the electronic devices.

Figure 8:
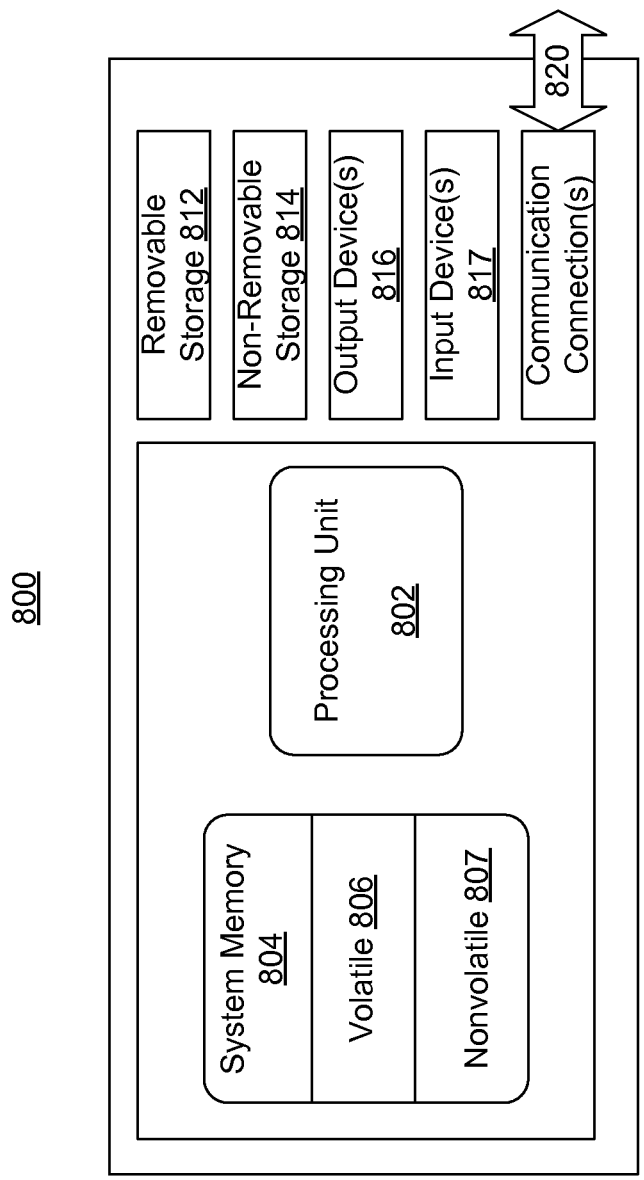
FIG. 8 depicts an example computer system that serves as a platform for embodiments of the present invention.

FIG. 8 depicts an example computer system 800 that may serve as a platform for embodiments of the present invention. For example, computer system 800 may serve as a platform for an electronic device such as a Laptops 105, 107, Tablet PC 109, cellular telephone 103, or other electronic device. In its most basic configuration, the computer 800 typically includes a processing unit 802 and memory 804. Pending on the exact configuration and type of computing device, memory 804 may be volatile (such as RAM), non-volatile (such as ROM, flash memory, etc.) or some combination of the two. Additionally, computer 800 may also have mass storage (removable 812 and/or non-removable 814) such as magnetic or optical disks or tape. In some embodiments, a shared workspace program is stored in nonvolatile memory 807 or storage 812, 814 and executed on processing unit 802. Shared workspace program might also be loaded in volatile memory 806 and executed on processing unit 802.

Similarly, computer 800 may also have input devices 817 and/or output devices 816. Other aspects of device 800 may include communication connections 820 to other devices, computers, networks, servers, etc. using either wired or wireless media. For example, the electronic devices may have a wireless network connection that allows them to access the Internet or another network. The electronic devices may also have communication connections between themselves.

Figure 9:
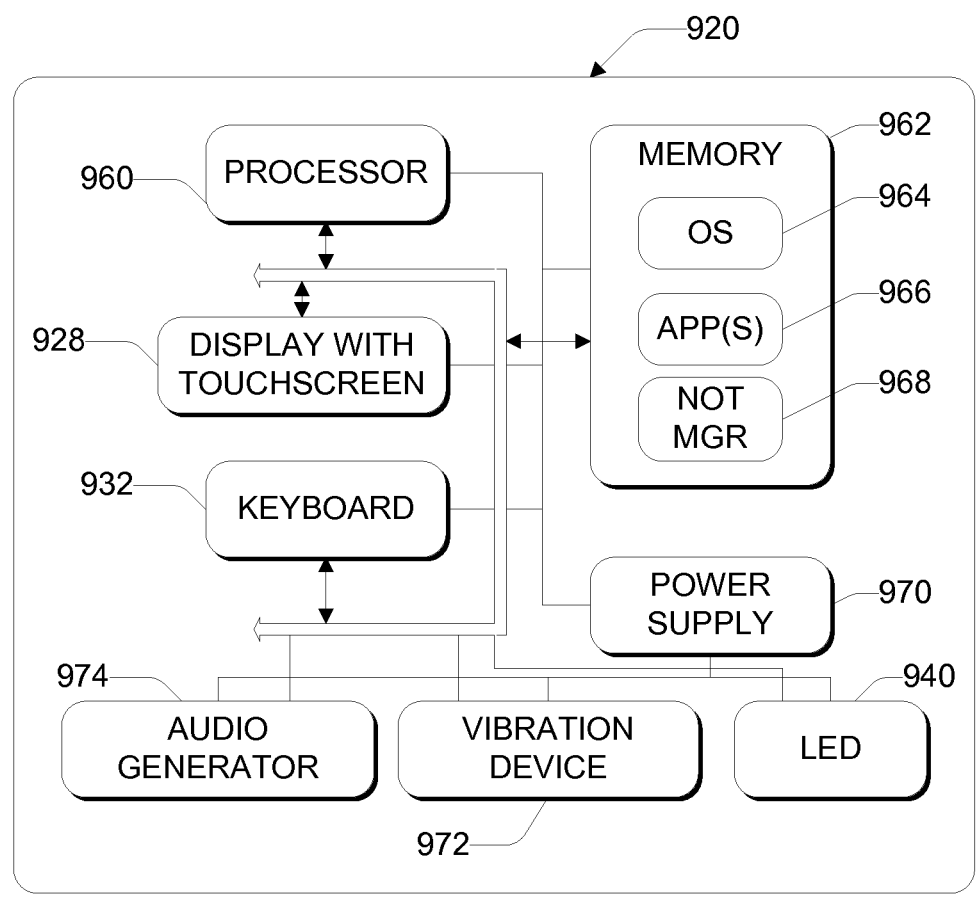
FIG. 9 shows functional components of a handheld computing device that serves as a platform for some embodiments of the present invention.

FIG. 9 shows functional components of a handheld computing device 920 that may serve as a platform for some embodiments. It has a processor 960, a memory 962, a display 928, and a keyboard 111 932. The memory 962 generally includes both volatile memory (e.g., RAM) and non-volatile memory (e.g., ROM, PCMCIA cards, etc.). An operating system 964 is resident in the memory 962 and executes on the processor 960. The H/PC 20 includes an operating system, such as the Windows® CE operating system from Microsoft Corporation or other operating system.

One or more application programs 966 are loaded into memory 962 and executed on the processor 960 by the operating system 964. Examples of applications include email programs, scheduling programs, PIM (personal information management) programs, word processing programs, spreadsheet programs, Internet browser programs, and so forth. In one embodiment, applications 966 include a shared workspace program.

The H/PC 920 also has a notification manager 968 loaded in memory 962, which executes on the processor 960. The notification manager 968 handles notification requests from the applications 966.

The H/PC 20 has a power supply 970, which is implemented as one or more batteries. The power supply 970 might further include an external power source that overrides or recharges the built-in batteries, such as an AC adapter or a powered docking cradle.

The H/PC 920 is also shown with three types of external notification mechanisms: an LED 940, a vibration device 972, and an audio generator 974. These devices are directly coupled to the power supply 970 so that when activated, they remain on for a duration dictated by the notification mechanism even though the H/PC processor and other components might shut down to conserve battery power. The LED 940 preferably remains on indefinitely until the user takes action. The current versions of the vibration device 972 and audio generator 974 use too much power for today's H/PC batteries, and so they are configured to turn off when the rest of the system does or at some finite duration after activation.

To make the drawing of FIG. 9 general to a variety of devices, not all components are depicted. The handheld computing device 920 could be used to implement a cellular telephone 103 with additional communication components.

Figure 10:
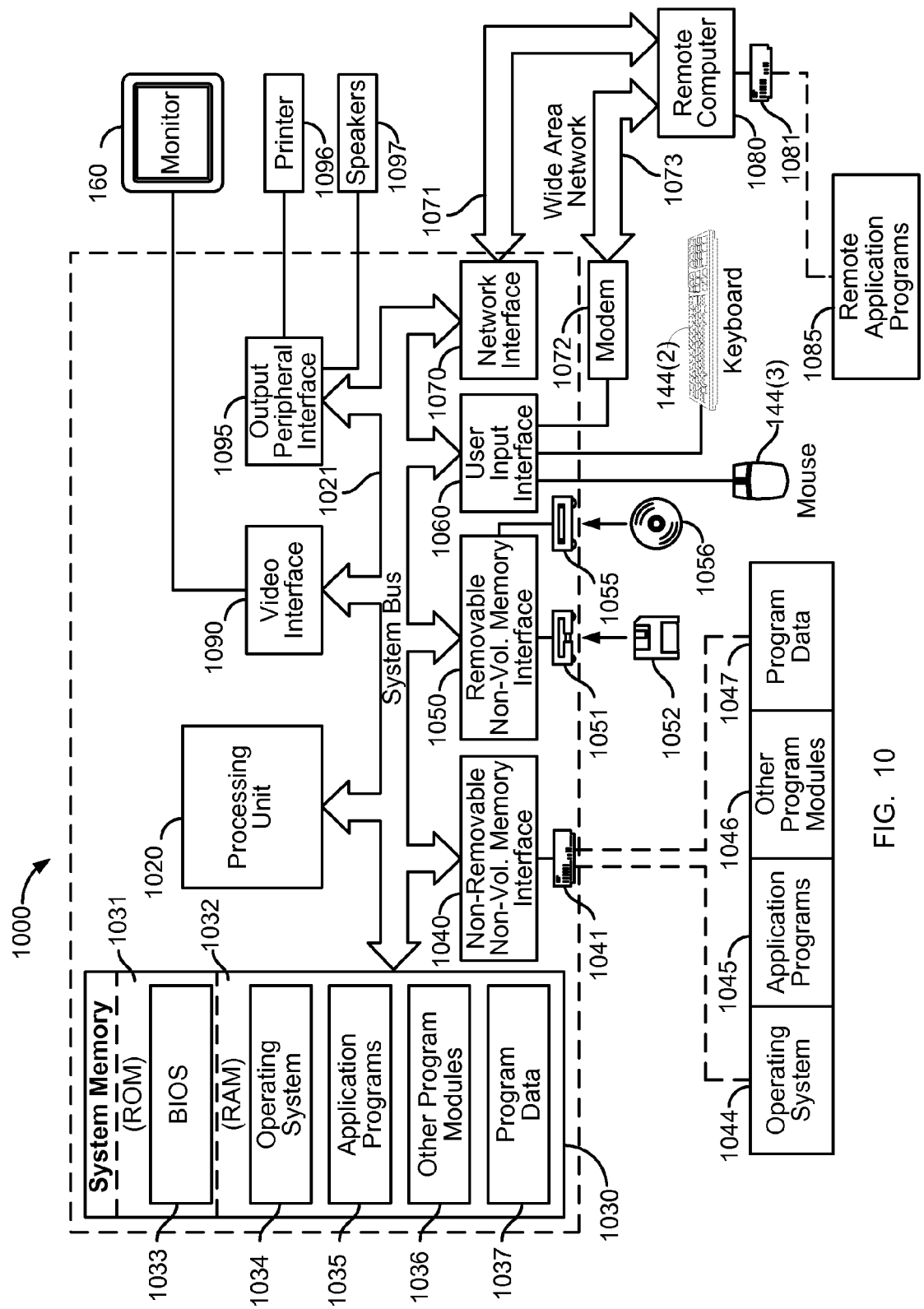
FIG. 10 shows an example configuration of a computer that serves as a platform for some embodiments of the present invention.

With reference to FIG. 10, an exemplary system for implementing some embodiments includes a general purpose computing device in the form of a computer 1000. For example, computer system 1000 may be used to implement electronic devices such as Laptops 107, 109, personal computers, etc. Components of computer 1000 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 1030 includes computer storage media in the form of volatile and/or nonvolatile memory such as ROM 1031 and RAM 1032. A basic input/output system (BIOS) 1033, containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037. Applications programs 1035 may include a shared workspace program.

The computer 1000 may also include other removable/non-removable, volatile/nonvolatile computer storage media. By way of example only, FIG. 10 illustrates a hard disc drive 1041 that reads from or writes to non-removable, nonvolatile magnetic media and a magnetic disc drive 1051 that reads from or writes to a removable, nonvolatile magnetic disc 1052. Computer 1010 may further include an optical media reading device 1055 to read and/or write to an optical media. Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 1041 is typically connected to the system bus 1021 through a non-removable memory interface such as interface 1040. Magnetic disc drive 1051 and optical media reading device 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1000. In FIG. 10, for example, hard disc drive 1041 is illustrated as storing operating system 1044, application programs 1045, other program modules 1046, and program data 1047. These components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 144(2) and a pointing device 144(3), commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus 1021, but may be connected by other interface and bus structures, such as a parallel port, game port or a universal serial bus (USB). A monitor 160 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1000 may operate in a networked environment using logical connections to one or more remote computers, such as a remote computer 1080. The remote computer 1080 may be another electronic device in the shared workspace. However, the remote computer 1080 could be a device that is not in the shared workspace such as a personal computer, a server, a router, a network PC, a peer device or other common network node, and may includes many or all of the elements described above relative to the computer 1000, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1000 is connected to the LAN 1071 through a network interface or adapter 1070. When used in a WAN networking environment, the computer 1010 typically includes a modem 1072 or other means for establishing communication over the WAN 1073, such as the Internet. The modem 1072, which may be internal or external, may be connected to the system bus 1021 via the user input interface 1060, or other appropriate mechanism. In a networked environment, program modules depicted relative to the computer 1000, or portions thereof, may be stored in the remote memory storage device. By way of example, and not limitation, FIG. 10 illustrates remote application programs 1085 as residing on memory device 1081. In some embodiments, remote application programs 1085 include a shared workspace program that is downloaded to computer 1000. It will be appreciated that the network connections shown are exemplary and other means of establishing a communication link between the computers may be used.

While some embodiments are implemented by executing computer readable instructions that are stored on computer readable media, this is not a requirement in all embodiments. Some embodiments may be implemented in hardware or a combination of hardware and software. For example, at least some of the steps of process 200, 300, 400, 500, 600, 650, 700, and/or 750 may be implemented within an ASIC. As a particular example, a portion of the electronic devices may be implemented with an ASIC.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a display;
   a processor coupled to the display; and
   a computer readable storage media device coupled to the processor, the computer readable storage media device having computer readable instructions stored thereon, the instructions which when executed on the processor cause the processor to:
   determine that a plurality of electronic devices that include the apparatus are to be part of a shared workspace that allows the electronic devices to share objects with each other, the apparatus uses short range wireless communications to locate the other electronic devices which are in close physical proximity to the apparatus;
   access a physical location of each of the plurality of electronic devices;
   receive a first object to be shared in the shared workspace by a first electronic device of the plurality of electronic devices;
   receive a second object to be shared in the shared workspace by a second electronic device of the plurality of electronic devices;
   generate a representation of the shared workspace based on capabilities of the apparatus and the physical locations of the plurality of electronic devices relative to the physical location of the apparatus, the generating a representation of the shared workspace including determining to include less than all of the plurality of electronic devices in the representation based on the capabilities of the apparatus, the included electronic devices are a first set of electronic devices;
   present the representation of the shared workspace on the display, including displaying the first object but not the second object;
   receive a request to pan the representation of the shared workspace to a physical location of an electronic device in the shared workspace that is not in the first set of electronic devices;
   determine a new representation of the shared workspace based on the physical locations the plurality of electronic devices that satisfies the request to pan, a second set of the plurality of electronic devices that is different from the first set is included in the new representation; and
   present the new representation of the shared workspace on the display in response to the request to pan, including displaying the second object but not the first object.

2. The apparatus of claim 1, wherein the instructions which when executed on the processor cause the processor to receive a request to pan the representation of the shared workspace to a different physical location and to determine a new representation of the shared workspace based on the physical locations the plurality of electronic devices that satisfies the request to pan include instructions which when executed on the processor cause the processor to:
   receive a request to pan to the right at time when the first object being shared by the first electronic device is being presented on the display of the apparatus;
   determine that the second electronic device is to the right of the first electronic device from the perspective of the apparatus; and
   determine that the second set includes the second electronic device responsive to the determination that the second electronic device is to the right of the first electronic device.

3. A method comprising:
   determining, by an apparatus, that a plurality of electronic devices that include the apparatus are to be part of a shared workspace that allows the electronic devices to share objects with each other, wherein the apparatus uses short range wireless communications to locate the other electronic devices which are in close physical proximity to the apparatus;
   accessing, by the apparatus, a physical location of each of the plurality of electronic devices;
   receiving a first object to be shared in the shared workspace by a first electronic device of the plurality of electronic devices;
   receiving a second object to be shared in the shared workspace by a second electronic device of the plurality of electronic devices;
   generating a representation of the shared workspace based on capabilities of the apparatus and the physical locations of the plurality of electronic devices relative to the physical location of the apparatus, the generating a representation of the shared workspace including determining to include less than all of the plurality of electronic devices in the representation based on the capabilities of the apparatus, the included electronic devices are a first set of electronic devices;
   presenting the representation of the shared workspace on a display of the apparatus, including displaying the first object but not the second object;
   receiving a request to pan the representation of the shared workspace to a physical location of an electronic device in the shared workspace that is not in the first set of electronic devices;
   determining a new representation of the shared workspace based on the physical locations the plurality of electronic devices that satisfies the request to pan, a second set of the plurality of electronic devices that is different from the first set is included in the new representation; and
   presenting the new representation of the shared workspace on the display in response to the request to pan, including displaying the second object but not the first object.

4. The method of claim 3, wherein the receiving a request to pan the representation of the shared workspace to a different physical location and to determine a new representation of the shared workspace based on the physical locations the plurality of electronic devices that satisfies the request to pan includes:
- receiving a request to pan to the right at time when the first object being shared by the first electronic device is being presented on the display of the apparatus;
- determining that the second electronic device is to the right of the first electronic device from the perspective of the apparatus; and
- determining that the second set includes the second electronic device responsive to the determination that the second electronic device is to the right of the first electronic device.

* * * * *